United States Patent [19]

Storr et al.

[11] Patent Number: 5,773,782
[45] Date of Patent: Jun. 30, 1998

[54] METHOD AND APPARATUS FOR THE MACHINING OF METAL BY SPARK EROSION

[75] Inventors: Manfred Storr; Wilhelm Rehbein, both of Stuttgart, Germany

[73] Assignee: Oel-Held GmbH, Stuttgart, Germany

[21] Appl. No.: 820,040

[22] Filed: Mar. 19, 1997

Related U.S. Application Data

[62] Division of Ser. No. 167,078, Dec. 15, 1993, abandoned.

[51] Int. Cl.⁶ .............................. B23H 1/00; H01B 3/22
[52] U.S. Cl. ..................... 219/69.14; 252/570; 252/578; 585/3; 585/5; 585/6.3
[58] Field of Search ........................ 219/69.14; 252/570, 252/572, 579, 578; 585/3, 5, 6.3

[56] References Cited

U.S. PATENT DOCUMENTS

| | | | |
|---|---|---|---|
| 2,176,952 | 10/1939 | Bovberich | 252/570 |
| 3,639,275 | 2/1972 | Stayner | 252/572 |
| 3,648,013 | 3/1972 | Stayner | 219/69.14 |
| 3,708,422 | 1/1973 | Swanson | 508/545 |
| 4,121,275 | 10/1978 | Ross et al. | 252/64 |
| 4,351,185 | 9/1982 | Garcia | 73/104 |
| 4,369,120 | 1/1983 | Stelz et al. | 252/68 |
| 4,436,641 | 3/1984 | Stelz et al. | 252/68 |
| 4,697,043 | 9/1987 | Rowe | 252/570 |
| 4,758,366 | 7/1988 | Parekh | 252/68 |
| 4,870,243 | 9/1989 | Wilson et al. | 219/69.14 |
| 5,013,858 | 5/1991 | Maryuovdt | 252/783 |
| 5,049,257 | 9/1991 | Furukawa | 208/14 |
| 5,136,116 | 8/1992 | Ohhazama et al. | 585/6.3 |

FOREIGN PATENT DOCUMENTS

| | | |
|---|---|---|
| 0 104 261 | 4/1984 | European Pat. Off. . |
| 0 261 546 | 3/1988 | European Pat. Off. . |
| 26 32 180 | 1/1978 | Germany . |
| 41 32 879 | 4/1993 | Germany . |
| 1-275699 | 11/1989 | Japan . |
| 2-173096 | 7/1990 | Japan . |
| 1003664 | 9/1965 | United Kingdom . |

OTHER PUBLICATIONS

Patent Abstracts of Japan, vol. 12, No. 336; Sep. 9, 1988 (JP–OS 63–99127).

"Important Facts About Spark Erosion" Oel–Held GmbH, Stuttgart, Germany, Jan. 1990.

*Primary Examiner*—Christine Skane
*Attorney, Agent, or Firm*—Evenson, McKeown, Edwards & Lenahan, P.L.L.C.

[57] ABSTRACT

A dielectric fluid for the machining of metal by spark erosion which contains saturated aliphatic hydrocarbons with a proportion of aromatic hydrocarbons which is lower than one percent in weight and to which an additive is added, wherein organic substances from the group of anthraquinone derivatives are added as the additive in a concentration of maximally one percent in weight.

4 Claims, 1 Drawing Sheet

METHOD AND APPARATUS FOR THE MACHINING OF METAL BY SPARK EROSION

This is a Divisional of application Ser. No. 08/167,078, filed Dec. 15, 1993 now abn.

BACKGROUND OF THE INVENTION

This invention relates to a dielectric liquid for the machining of metal by means of spark erosion.

In the spark erosion process, an eroding machining of a workpiece takes place by spark discharges between a working electrode and the workpiece which acts as the other electrode. Between the electrodes, the dielectric fluid is situated which insulates the electrodes from one another in such a manner that the electric breakdown does not take place before the smallest possible distances are obtained. In addition, the dielectric must permit the buildup of a spark as fast as possible; it must constrict, if possible, the spark discharge channel during the discharge for achieving a high energy density; and it must rapidly deionize the discharge channel after the termination of the spark. In addition, it is used for the cooling of the working electrode and of the workpiece as well as for the carrying-away of the contaminants which are removed from the workpiece and, as a result of wear, from the working electrode.

The dielectric therefore has an important influence on the course of a spark discharge—a process which is not yet fully understood in all its details and which is the subject of intensive research. The different demands to be made on the dielectric fluid are described, for example, in the brochure "Important Facts About Spark Erosion" of the firm Oel-Held, March 1990 Edition. From this brochure, it is also known to use dielectrics on the basis of de-ionized water or of hydrocarbon compounds obtained by the distillation and refining of mineral oils or synthetically. Known dielectric fluids for the machining of metal contain either high concentrations of aromatic hydrocarbon compounds which are problematic with respect to occupational safety, or are relatively severely limited in their erosion performance as well as, particularly during polishing erosion, with respect to the surface quality because in this case the low energy contents of the respective used sparks have as a prerequisite an extremely narrow working gap which results in the collapse of the erosion process.

A transparent dielectric liquid of this type for spark erosion machines is known from European Patent Document EP 0 261 546 A2. This dielectric liquid consists of a mixture of mineral oil and/or a synthetic oil and a specific proportion of de-ionized water. In this case, paraffin oils, for example, are used as the mineral oil. Furthermore, a surface-active additive in a concentration of between 5 and 40 percent in weight is added to the described mixture, which additive has multiple compounds of carbon atoms. When such a dielectric is used, the above-mentioned disadvantages may occur.

German Patent Document DE 26 32 180 A1 discloses another dielectric fluid which consists, by at least 30 percent in weight, of aromatic compounds which contain at least two homocyclic, monocyclic $C_6$-ring structures. By means of such a dielectric, the different requirements during the roughing-down, on the one hand, and during the planing, on the other hand, are to be satisfactorily met in each case. However, from the viewpoint of occupational safety, the use of such aromatic compounds in such concentration is problematic. The use of such a dielectric therefore requires corresponding safety expenditures so that no toxic or allergic reactions will occur when this fluid is handled. It is known, for example, that a number of aromatic compounds belong to the cancer-causing substances. Dielectrics on a base of water or saturated aliphatic hydrocarbons do not contain such aromatic compounds in such high concentrations.

In British Patent Document GB-PS 10 03 664, the use of dielectrics is recommended which have a carbon:hydrogen ratio of between 0.8 : 1 and 1.8 : 1 and are obtained from a fractionation of coaltar. These are also hydrocarbon mixtures with a high proportion of aromatic compounds.

U.S. Pat. No. 3,639,275 describes the addition of an additive to a dielectric on a mineral oil base, the mineral oil containing between 10 and 30 percent in weight of aromatic hydrocarbons and the additive consisting of homocyclic monocyclic hydrocarbons in the form of phenol compounds as well as organic alkaline-earth sulfonates. This dielectric therefore also has a high proportion of aromatic compounds. Also, the addition of the phenol compounds which act as antioxidant agents presents problems with respect to occupational safety.

U.S. Pat. No. 3,648,013 sees an improvement of the characteristics of the dielectric by the addition of an alkyl salicylic acid chromium salt as well as an alkaline earth salt of certain dialkyl sulfosuccinates or a concentration of 1 to 10percent in weight respectively for the purpose of improving conductivity. The alkyl salicylic acid chromium salt is a monocyclic aromatic compound with a heavy metal having a toxic effect, which today also presents problems with respect to occupational safety.

The adding of an additive to a dielectric on a silicone, oil or hydrocarbon base is also known from U.S. Pat. No. 3,708,422. There, the adding of aliphatic hydrocarbon amines is recommended which consist of 10 to 50 carbon atoms. By means of such an additive, the metal erosion index is to be improved, in which case the concentration of the additive is considered to be uncritical.

It is an object of the invention to provide a dielectric fluid of the initially mentioned type which, when it is used during spark erosion, causes a best-possible implementation of the process and particularly a high erosion performance while the wear of the working electrode is low at the same time and which can be used in a comparatively unproblematic manner with respect to occupational safety aspects.

This object is achieved by a dielectric fluid which contains saturated aliphatic hydrocarbons with a proportion of aromatic hydrocarbons which is lower than one percent in weight and to which an additive is added, wherein organic substances from the group of anthraquinone derivatives are added as the additive in a concentration of maximally one percent in weight. Since it consists essentially of a mixture of water and polyhydric alcohol or of saturated aliphatic hydrocarbon compounds which may have a naphthenic, n-paraffinic or iso-paraffinic structure or may consist of a mixture of these, no high concentrations of aromatic compounds will occur. At the same time, it was found that the addition of the additive of a higher polarizability in comparison to saturated aliphatic hydrocarbons in a concentration of maximally one percent in weight has a very targeted positive influence on the spark erosion operation. The addition of the additive to the dielectric base fluid takes place not only for the improvement of the metal erosion rate or for the reduction of the wear of the workpiece electrode. Its main purpose is to charge chemical satellite electrodes in the dielectric by means of substances which float in the dielectric fluid in a dispersed manner and, because of the effect of the electric field between the electrodes become stronger dipoles than the aliphatic hydrocarbons.

Other objects, advantages and novel features of the present invention will become apparent from the following detailed description of the invention when considered in conjunction with the accompanying drawings.

DETAILED DESCRIPTION OF THE INVENTION

Figure 1:
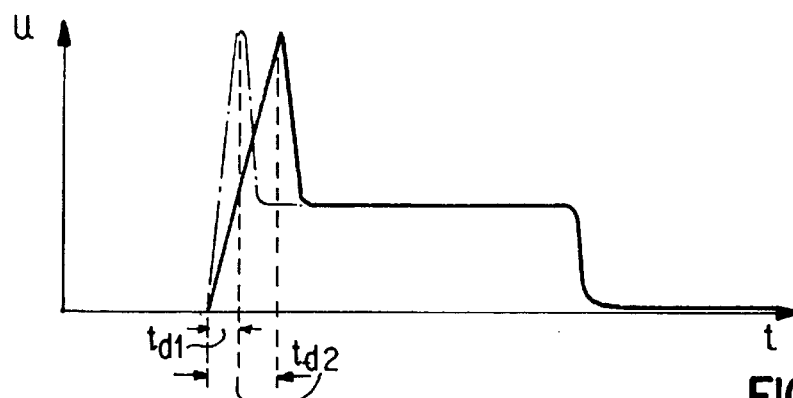
FIG. 1 is a two-part graph comparing the voltage and current versus time for conventional dielectrics and dielectrics according to preferred embodiments of the invention.
Figure 1A:
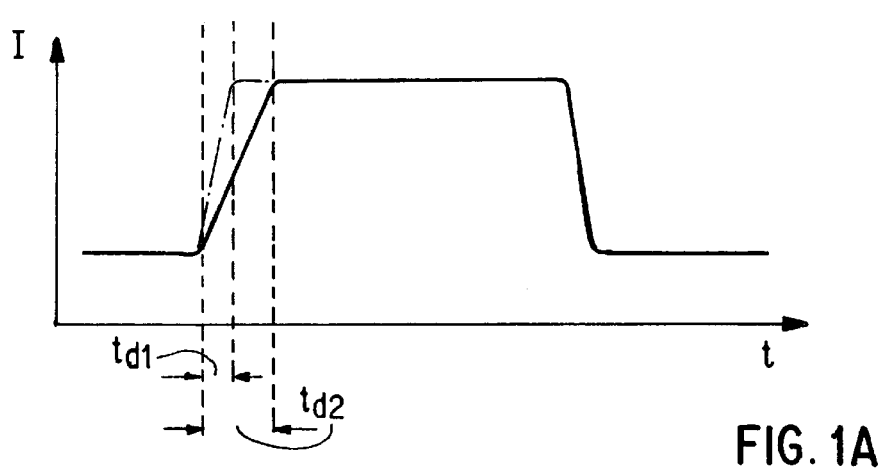

When the voltage is applied using the dielectrics according to the invention, these chemical satellite electrodes are aligned along the lines of electric flux of the electric field and influence the spark discharge in the manner illustrated in FIG. 1. This FIG. 1 illustrates, by means of a solid line, in each case the voltage course (U) and the current course (I) when a conventional dielectric is used and, by means of interrupted lines the corresponding course when a dielectric according to the invention is used. $t_{d1}$ indicates the sparking delay in the case of the dielectric according to the invention, and $t_{d2}$ indicates the sparking delay in the case of the conventional dielectric.

1.) Channels with an increased electric conducting capacity are created in the dielectric fluid along the chemical satellite electrodes. The discharge bridge required for the spark breakdown is built up more rapidly, which leads to a steeper rise of the breakdown voltage (see FIG. 1, course of the voltage U above the time) and thus to a faster discharge operation. This increases the erosion of material per time unit.

2.) Also, in contrast to the previously customary spark erosion fluids, in the case of the new dielectric, the electron flow does not take place directly from the cathode to the anode. In this case, the electrons are attracted on their path predominantly by the dispersed chemical satellite electrodes and are transmitted along multiply branched discharge channels. Since they lose a portion of their kinetic energy during the operation, they finally arrive on the anode with a relatively low energy.

Because of the steep rise of the breakdown voltage, a reduction of the sparking delay is achieved at the same time (see FIG. 1). Both effects cause a reduction of up to 25% of the wear of the anode (in the case of coarse and medium machining stages, of the tool electrode) in comparison to conventional dielectrics for spark erosion.

Figure 2:
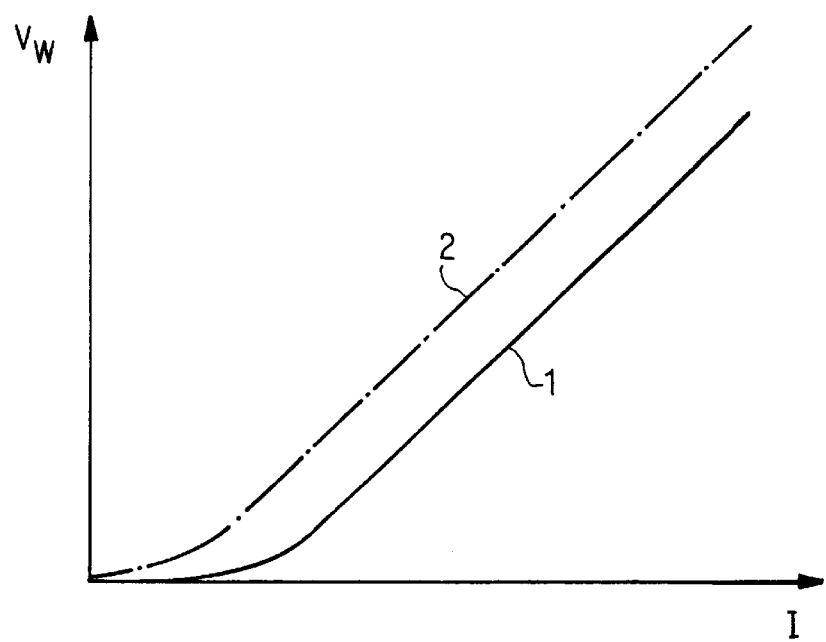
FIG. 2 is a graph comparing the erosion rate versus current for conventional dielectrics and dielectrics according to preferred embodiments of the invention.

3.) During polishing erosion (finest machining stages), the workpiece is used as the anode in reversed polarity. As a result, the electrons will now—again caused by the chemical satellite electrodes—arrive on the workpiece with a kinetic energy which is lower in comparison to conventional dielectrics and arrive there in a comparatively widely scattered manner. However, mainly the capability of the chemical satellite electrodes of accelerating the buildup of the discharge bridge between the electrodes results in the possibility of using a lower medium working current for the machining of the workpiece. This is illustrated in FIG. 2 where the action of the erosion rate ($V_W$) is entered when the medium working current (I) is reduced. It is clearly demonstrated that the course of the curve 1, which corresponds to the action of the conventional dielectric, is situated below the curve 2 which illustrates the action of the erosion rate ($V_W$) with respect to the working current (I) of a dielectric according to the invention. The working current which is required for the same erosion is lower for the invention. By means of this technique, which had not been possible by means of previously customary fluids, polished workpiece surfaces may easily be achieved which have surface roughnesses of less than 0.1 micrometers. With respect to its surface quality and rapidity, this polishing performance cannot be achieved by means of the previously customary dielectrics on a base of water or saturated aliphatic hydrocarbons without the addition of an additive according to the invention.

Another advantage of the invention is the fact that it was recognized that the use of the highly polarizable additive in the mentioned low concentration positively influences also the dispersing characteristics of the dielectric. It was observed that the dirt particles removed during the spark discharge fly apart in the manner of an explosion out of the spark discharge range while being dispersed extremely well. This also reduces the tendency to short-circuit. The reason for this good dispersing characteristic may be that the molecules of the additive which are aligned in the satellite electrodes as electric dipoles cause a faster distribution of the eroded metallic, that is, electrically conductive dirt particles as a result of electric repulsive forces.

In the following, the invention will be briefly explained by means of an example of an additive.

To a synthetically produced mixture of n- and iso-paraffins with the following physical data:

| | |
|---|---|
| density at 15° C. | 0.7930 g/cm$^3$ |
| kinetic viscosity at 20° C. | 4.3 mm$^2$/s |
| kinetic viscosity at 40° C. | 2.8 mm$^2$/s |
| flash point (PM) | 107° C. |
| content of aromatic compounds | <0.5% in weight |

0.004% in weight of a dye are admixed which is called Solvent Green 5 in Part I of the known Color Index. This substance is an anthraquinone derivative. In the used amount, this substance does not present any problems with respect to aspects of occupational safety and work hygiene.

During tests on a commercial spark erosion machine of the firm MAHO-Hansen GmbH, 6116 Eppertshausen, the following eroding results were measured:

CU-electrode 10×10 mm, power stage LS 10-3/pulse duration Ti 175-20 μs/pulse duty factor Tau 75–60%/eroding time=1 h.

| | Erosion (mm$^3$/min) | Wear (%) |
|---|---|---|
| Conventional Dielectric: | 6.96 | 0.21 |
| Tested Dielectric As Noted: | 8.80 | 0.0 |
| Polishing Test: | (Roughness) | |

| | Ra after 4 h | Ra "Completely Eroded" |
|---|---|---|
| Conventional Dielectric: | 0.19 μm | 0.13 μm |
| Tested Dielectric As Noted: | 0.09 μm | 0.09 μm |

The results illustrated in FIGS. 1 and 2 and the above-explained results were achieved by using a dielectric according to this example (Solvent Green).

It should be noted that the dielectric fluid according to the invention is suitable for all filter elements which are normally used in spark erosion systems and, because of its composition, does not have to be classified as a flammable fluid and therefore does not represent dangerous material.

Summarizing, it may be stated that, because of the addition of an additive of high polarizability at a low concentration as a targeted contamination of a dielectric on a base of water or on a base of saturated aliphatic hydrocarbons, the invention causes a significant improvement of the spark eroding characteristics which is mainly caused by the effect of the formation of chemical satellite electrodes by the highly polarizable molecules of the additive. While the process parameters are otherwise the same, the erosion performance rises considerably during the roughing; a further rise may be expected because of the fact that shorter pulse durations become possible between the spark discharges because of the faster rise of the breakdown voltage. While the electrode polarity is reversed, excellent polishing results may be obtained within a very brief period.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. In a method for the machining of metal by spark erosion which comprises providing a dielectric fluid between an electrode and a metal workpiece and causing a spark discharge between said electrode and said workpiece, the improvement comprising providing as said dielectric fluid a composition consisting essentially of saturated aliphatic hydrocarbons and Solvent Green 5, said saturated aliphatic hydrocarbons containing no more than 1% by weight of aromatic hydrocarbons, said Solvent Green 5 being present in an amount of no more than 1% by weight, whereby the metal erosion rate is improved and wear of a work piece electrode is reduced.

2. The improvement of claim 1, wherein the concentration of the Solvent Green 5 is 0.004 percent by weight.

3. In a spark discharge apparatus for the machining of metal by spark erosion which comprises an electrode, a metal workpiece, and a dielectric fluid between said electrode and said metal workpiece and means for causing a spark discharge between said electrode and said workpiece, the improvement which comprises said dielectric fluid comprising saturated aliphatic hydrocarbons and Solvent Green 5, said saturated aliphatic hydrocarbons containing no more than 1% by weight of aromatic hydrocarbons, said Solvent Green 5 being present in an amount of no more than 1% by weight, whereby the metal erosion rate is improved and wear of said electrode is reduced.

4. The improvement of claim 3, wherein the concentration of the Solvent Green 5 is 0.004 percent by weight.

* * * * *